UNITED STATES PATENT OFFICE.

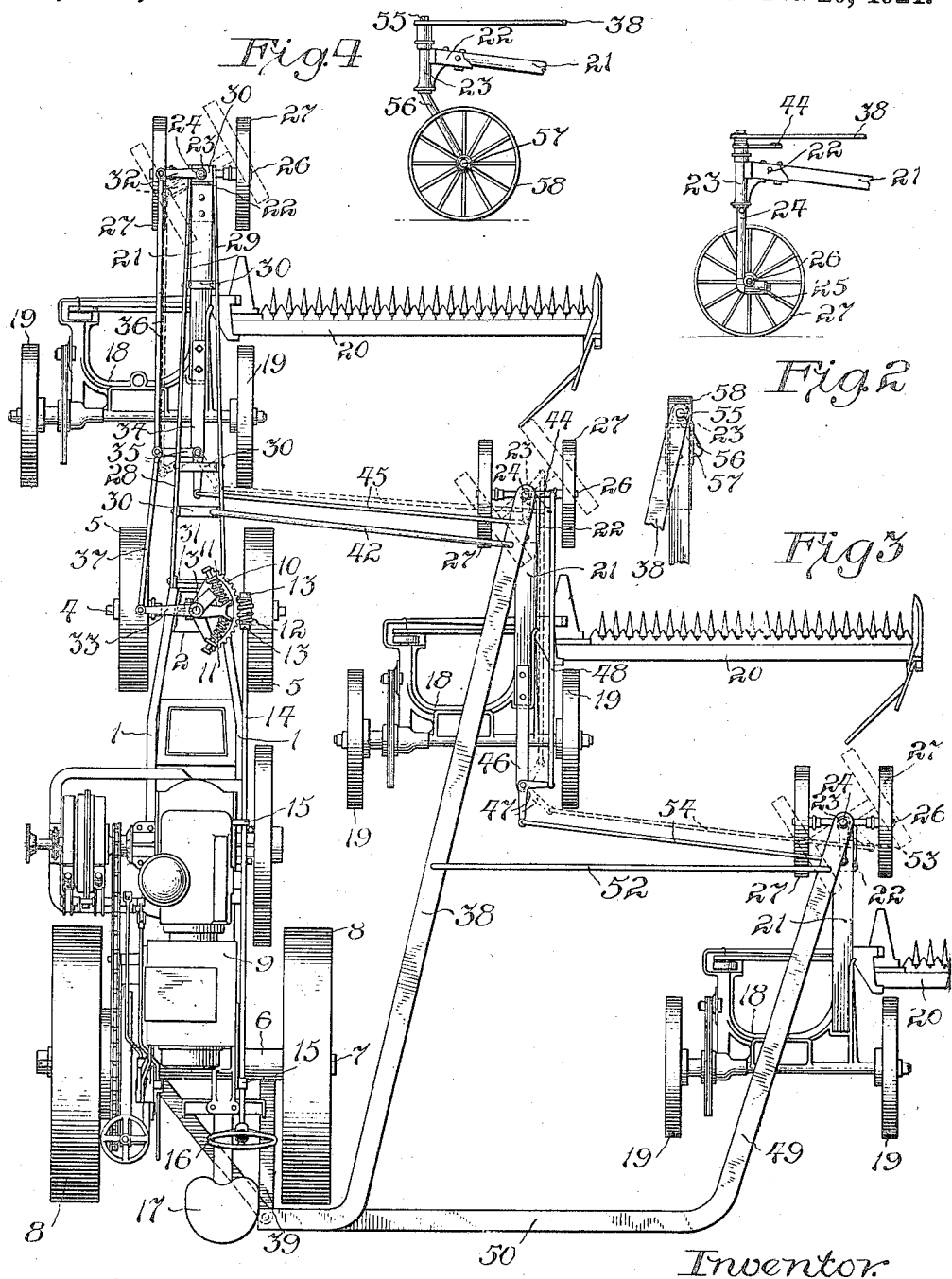

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

DRAFT CONNECTION.

1,400,861. Specification of Letters Patent. Patented Dec. 20, 1921.

Application filed March 25, 1916, Serial No. 86,759. Renewed November 22, 1919. Serial No. 339,965.

*To all whom it may concern:*

Be it known that I, EDWARD W. BURGESS, a citizen of the United States, residing at Chicago, in the county of Cook and State of Illinois, have invented certain new and useful Improvements in Draft Connections, of which the following is a full, clear, and exact specification.

My invention relates to draft connections in its general application, and is adapted in particular for use in connection with a traction engine when coupled with one or more implements propelled or drawn in tandem and offset relation by the power of the traction engine, and it includes means whereby a single machine unit or a plurality of machine units, which are shown as mowers, are coupled with a tractor in offset relation and in a manner whereby the steering elements of the machines are operatively connected with the steering mechanism of the tractor or adapted to be controlled thereby.

The object of the invention is to provide improved draft connections between the machines and tractor, coöperating with the steering elements of the tractor and the machines whereby a plurality of machines may be propelled and their line of travel controlled by the tractor as an operative unit, and means whereby the draft connections may be readily and quickly detached from the tractor. These objects are attained by means of the mechanism illustrated in the accompanying drawings, in which—

Figure 1 is a top plan view of a tractor having a series of mowers connected therewith and embodying my invention;

Fig. 2 is a side elevation of a detached detail of part of a mower tongue truck forming part of the mower equipment, as shown in Fig. 1;

Fig. 3 is a top plan view of a modified form of tongue truck comprising a single caster wheel journaled upon a supporting stem; and Fig. 4 is a side elevation of Fig. 3.

The same reference characters designate like parts throughout the several views.

The tractor includes a truck frame 1 having a bolster member 2 at its front end, in which is journaled a vertically disposed stem 3, having its lower end operatively connected with a steering axle 4 in any preferred manner, and wheels 5 journaled upon opposite ends of the steering axle. The rear end of the truck frame is carried by a transverse tubular frame member 6, in which is journaled an axle 7, having traction wheels 8 mounted upon its opposite ends. 9 represents an internal combustion engine mounted upon the truck frame and operatively connected with the traction wheels, 10 a worm sector secured to the upper end of the stem 3, 11 a buffer spring mechanism yieldingly opposing a swinging movement of the steering axle in opposite directions, 12 a worm engaging with the sector and journaled in a bearing 13 carried by the truck frame, and 14 a rearwardly extending shaft journaled in brackets 15, having its front end operatively connected with the worm 12 and its opposite end provided with a hand wheel 16 convenient to an operator in the seat 17 of the tractor, who may thereby control the direction of travel of the tractor.

The mowers shown are substantially the same in their construction, and may be any of the standard forms, including a main frame 18, carrying wheels 19, finger bar 20, and stub tongue 21. Secured to the front end of the stub tongue is a bracket member 22, having a vertically disposed sleeve 23, in which is journaled a stem 24, having its lower end turned rearwardly and received by a bracket member 25 connected with a truck axle 26, having wheels 27 journaled upon its opposite ends. The front machine of the series is connected with the tractor by means of a coupling frame 28, including side bars 29 spaced apart and converging toward their front ends and connected by means of bridge members 30. The rear ends of the bars are pivotally connected with the front end of the truck frame of the tractor by means of a transversely disposed pin 31. The bridge member 30 at the front end of the frame is provided with an opening that receives the upper end of the stem 24 of the tongue truck, and secured to the stem is an arm 32. 33 represents a laterally extending arm preferably integral with the worm sector 10, and 34 a rearwardly extending bar secured to the frame of the mower and having pivotally mounted upon its rear end a bell crank lever 35 having one of its arms connected by means of a link 36 with the free end of the arm 32, and by means of a second link 37 with the free end of the arm 33 whereby, when the steering mechanism of the tractor is manipulated to turn its steering axle in either direction, the axle of the mower tongue truck will be turned in the same direction, the relative length of the different arms being proportioned in a manner to turn the axle of the tongue truck at a proper angle relative to the line of draft.

The second mower of the series is connected with the tractor by means of a push bar 38, having an opening at its front end that receives the upper end of the stem of the tongue truck in the same way as the bridge member 30 of the coupling frame 28, and having its rear end connected with the rear end of the tractor draw bar 39, and 42 represents a truss rod connecting the front end of the push bar 38 with the rear bridge member 30 of the coupling frame 28. 44 represents a bell crank lever secured to the upper end of the stem of the tongue truck and having one of its arms connected by means of a link 45 with the remaining arm of the bell crank lever 35, whereby the axle of the second tongue truck is turned with that of the first. 46 represents a rearwardly extending bar secured to the mower frame and having a bell crank lever 47 pivotally mounted upon its rear end, and 48 a link connecting the remaining arm of the bell crank 44 with one of the arms of the bell crank 47.

The third mower of the series is connected with the tractor by means of a push member having a forwardly inclined portion 49, provided with an opening that pivotally receives the stem of the tongue truck the same as the other units of the series, and a part 50 extending stubbleward in rear of the traction wheels of the tractor and connected with its draft bar 39, and 52 represents a truss rod connecting the front end of the part 49 of the push member with the push bar 38 of the second unit. 53 represents an arm secured to the upper end of the stem of the tongue truck, and 54 a link connecting the free end of the arm with the remaining arm of the bell crank lever 47. The arms of the several bell crank levers are to be given a length relative to each other and to the arm on the worm sector of the tractor steering mechanism that will turn the axle of the tongue truck of each unit of the series to a degree of inclination to the line of draft that will permit a free movement of the individual units of the series. In the modified form of tongue truck illustrated in Fig. 3 the stem 55 journaled in the sleeve 23 is provided with an offset portion 56 having a horizontally disposed portion 57 at its lower end, upon which is journaled a caster wheel 58. If this form of tongue supporting truck be substituted for that shown in Fig. 2, the action of the push members connecting the tractor with the implement units and having their movement controlled by the truck frame of the tractor, will swing the stub tongues of the mowers laterally upon their caster wheels and the elements connecting the steering trucks with the tractor steering mechanism may be eliminated.

In operation the machines are pushed by power derived from the tractor and applied to the stems of the tongue trucks with the same effect as if they were drawn by teams of horses separately. The push members are free to rise and fall at their front ends, permitting the tongue trucks to follow an uneven ground surface, and they are rigidly held against a lateral movement relative to the tractor, and combined they operate as an interconnected unit with the tractor in propelling the series of machines in any direction, and the steering mechanism of the tractor controls the direction of travel of each unit of the series of machines. The machines are all in front of the operator, enabling him to continuously watch their operation.

Having shown and described one embodiment of my invention, I do not desire that it be limited to the precise details of construction as illustrated, it being understood that changes may be made in the form, proportion and organization of its various parts without departing from the spirit of my invention.

What I claim as my invention, and desire to secure by Letters Patent, is:

1. In combination, a tractor, steering means carried thereby, an implement operatively connected to the tractor and having steering means, and means operatively connecting the tractor steering means with the implement steering means.

2. In combination, a tractor, including an axle and steering wheel carried thereby, an implement having a steering wheel, and steering means for the implement operatively connecting the implement steering wheel with the tractor steering wheel.

3. In combination, a tractor, steering means carried thereby, an implement operatively connected to the tractor and having cutting mechanism and steering means, and means operatively connecting the tractor steering means with the implement steering means.

4. In combination, a tractor having steering mechanism, an implement having carrying wheels and steering elements, a rigid push member connecting said tractor to said implement, and operative steering connections between said tractor steering mechanism and said implement steering elements.

5. In combination, a tractor having steering mechanism, a series of implements having carrying wheels and steering elements, rigid push members connecting said implements to said tractor, and operative steering connections between the steering elements of each of said implements and the steering mechanism of said tractor.

6. A mechanism of the class described including, in combination, a tractor including a truck frame and a steering mechanism, an implement including carrying wheels, a draft tongue, a tongue truck supporting said draft tongue, rigid propelling means connecting said draft tongue with the truck frame of the tractor, and rigid operative steering connections between the tractor steering mechanism and the wheels of said tongue truck.

7. A mechanism of the class described including, in combination, a tractor including a truck frame and a steering mechanism, an implement including carrying wheels, a draft tongue, a tongue truck supporting said draft tongue, a push frame having its rear end connected with the front end of the truck frame of said tractor and its front end with the front end of said draft tongue, and operative steering connections between said tractor steering mechanism and the wheels of said tongue truck.

8. A mechanism of the class described including, in combination, a tractor including a truck frame and a steering mechanism, an implement including carrying wheels, a draft tongue, a tongue truck supporting the front end of said draft tongue and including a vertically disposed stem, said stem being journaled upon the front end of said draft tongue, an arm secured to said stem, a push member having its rear end connected with the front end of the truck frame of the tractor and its front end pivotally connected with the front end of said draft tongue, and operative connections between the tractor steering mechanism and the arm secured to the stem of said tongue truck.

9. A mechanism of the class described including, in combination, a tractor including a truck frame and a steering mechanism, an implement including a main frame, carrying wheels, a draft tongue, a tongue truck supporting the front end of said draft tongue, steering means forming a part of said tongue truck, a push member having its rear end connected with the front end of said tractor truck frame and its front end pivotally connected with the front end of said draft tongue, operative connections between said tractor steering means and said tongue truck steering means, a second implement disposed in rear of and offset from said first implement and including a supporting and steering truck, a propelling connection between said second implement and said tractor, and operative connections between the steering truck of the second implement and the steering means of the tongue truck of the first implement.

10. A mechanism of the class described including, in combination, a tractor including a truck frame and a steering mechanism, an implement including a main frame, carrying wheels, a draft tongue, a tongue truck supporting the front end of said draft tongue, steering means forming a part of said tongue truck, a bell crank lever pivotally mounted upon said implement frame, a push member having its rear end connected with the front end of the truck frame of said tractor and its front end pivotally connected with the front end of said draft tongue, operative connections between said tractor steering means and said bell crank lever and between said bell crank lever and said tongue truck steering means, a second implement disposed in rear of and offset from said first implement and including a supporting and steering truck, a propelling connection between said second implement and said tractor, and operative connections between the steering truck of said second implement and the bell crank lever carried by said first implement.

11. A mechanism of the class described including, in combination, a tractor including a steering mechanism, an implement including carrying wheels and a wheel supported draft tongue, and a push member having its rear end connected with said tractor and its front end pivotally connected with the front end of said draft tongue, said push member being secured against a swinging movement laterally relative to said tractor.

12. A mechanism of the class described including, in combination, a tractor including a steering mechanism, a series of mowers including carrying wheels and wheel supported draft tongues, said mowers being spaced apart in the direction of the line of draft and disposed in offset relation laterally in a line inclined grassward from a point in front of said tractor, and push members trussed laterally and connecting the front ends of said draft tongues with said tractor.

13. A mechanism of the class described including, in combination, a tractor including a truck frame and a steering mechanism, a series of mowers including carrying wheels and draft tongues, wheel trucks supporting the front ends of said draft tongues, said mowers being spaced apart in the direction of the line of draft and disposed in offset relation laterally in a line inclined grassward from a point in front of said tractor, and interconnected push members coupled with the tractor and the front ends of said draft tongues.

14. A mechanism of the class described including, in combination, a tractor including a truck frame and a steering mechanism, a series of mowers including carrying wheels and draft tongues, wheel trucks supporting the front ends of said draft tongues, said mowers being spaced apart in the direction of the line of draft and disposed in offset relation laterally in a line inclined grassward from a point in front of said tractor, push members connected with said tractor and with the front ends of said draft tongues, and truss members connecting said push members whereby they operate as a unit with the tractor in propelling the mowers in any direction.

In testimony whereof I affix my signature.

EDWARD W. BURGESS.